United States Patent [19]

Ashe

[11] 4,032,698
[45] June 28, 1977

[54] POLYMERIC MATERIALS WITH SUBSTITUTED UREA END GROUPS

[75] Inventor: Thomas A. Ashe, Kansas City, Mo.

[73] Assignee: E. I. Du Pont de Nemours and Company, Wilmington, Del.

[22] Filed: Oct. 29, 1975

[21] Appl. No.: 626,754

Related U.S. Application Data

[63] Continuation-in-part of Ser. No. 329,152, Feb. 2, 1973, abandoned, which is a continuation-in-part of Ser. No. 133,452, April 12, 1971, abandoned, which is a continuation-in-part of Ser. No. 39,534, May 21, 1970, abandoned.

[52] U.S. Cl. .............................. 526/14; 260/77.5 R; 260/78 UA; 260/79.5 R; 260/79.5 C; 260/79.5 NV; 526/11.1; 526/21; 526/23; 526/30; 526/49; 526/56

[51] Int. Cl.² ........................................ C08F 20/18

[58] Field of Search ....... 260/78 A, 78 UA, 77.5 R, 260/77.5 MA, 77.5 AP, 77.5 AT, 77.5 A, 77.5 CR, 77.5 AM, 78.41, 79.5 R, 79.5 C, 79.5 NV; 526/11.1, 14, 29, 30, 49, 56

[56] References Cited

UNITED STATES PATENTS 3,483,123  12/1969  Grimm et al. ............ 260/79
3,551,390  12/1970  Krimm et al. ............ 260/86.1 N

OTHER PUBLICATIONS

*Hackh's Chemical Dictionary*, Fourth Edition, 1969, p. 197.

Primary Examiner—Harold D. Anderson

[57] ABSTRACT

Polymeric materials represented by the general structure

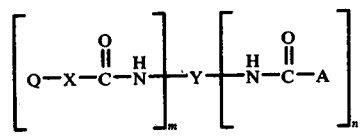

where
- Q is a polymeric segment of ethylenically unsaturated monomers, lacking Zerewitinoff hydrogen atoms;
- X is the residue of a chain transfer agent;
- Y is the residue of a di-, tri- or tetraisocyanate radical after removal of isocyanate groups;
- A is the residue of a basic radical which, as an entity before reaction, has a $pk_a$ value of 5–14, or a salt thereof, and
- m and n are 1, 2 or 3 (the total not exceeding 4), are useful as pigment dispersing aids in coating compositions.

9 Claims, No Drawings

POLYMERIC MATERIALS WITH SUBSTITUTED UREA END GROUPS

CROSS-REFERENCE TO RELATED APPLICATIONS

This application is a continuation-in-part of application Ser. No. 329,152, filed Feb. 2, 1973; which in turn is a continuation-in-part of application Ser. No. 133,452, filed Apr. 12, 1971; which in turn is a continuation-in-part of application Ser. No. 39,534, filed May 21, 1970, all now abandoned.

STATEMENT OF THE INVENTION

This invention relates to polymeric materials. It is more particularly directed to polymeric materials represented by the structure

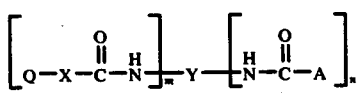

(1)

where
- Q is a polymeric segment of ethylenically unsaturated monomers, lacking Zerewitinoff hydrogen atoms;
- X is the residue of a chain transfer agent;
- Y is the residue of a di-, tri- or tetraisocyanate radical after removal of isocyanate groups;
- A is the residue of a basic radical which, as an entity before reaction, has a $pk_a$ value of 5–14, or a salt thereof, and
- m and n are 1, 2 or 3 (the total not exceeding 4).
- When n is 2 or 3, only one of A need be as defined.

Utility

The polymeric materials of the invention are useful as aids for dispersing solid particles in organic liquids.

They are especially useful as aids for dispersing pigments in organic liquids. Illustrative of the pigments which can be dispersed are titanium dioxide, carbon black, zinc oxide, lead titanate, potassium titanate, antimony oxide, lithopone, phthalocyanine blue, quinacridone, "Irgazin" yellow, ferric hydrates and the like.

Pigment dispersions made with the polymeric materials of the invention are remarkably resistant to flocculation, which gives the paints into which the dispersions are incorporated higher initial gloss, better hiding and tinting strength, and makes them resistant to color drift and gloss loss. These pigment dispersions can also be used satisfactorily with many more diverse types of paints than conventional pigment dispersions. Moreover, a dispersion made with a polymeric material of the invention can have a significantly higher pigment content, while retaining the same degree of fluidity, than when conventional aids are used.

The polymeric materials of the invention can be used as pigment dispersing aids by dissolving from 0.001 to about 2.00 grams of polymeric material per square meter[1] of surface area of the pigment to be used, preferably 0.004 to about 0.100 gram per square meter, in an organic liquid compatible with the paint into which the pigment dispersion is to be incorporated. Illustrative or organic liquids which can be used are aliphatic and aromatic hydrocarbons, ethers, esters, ketones, alcohols and mixtures of these.

[1]Measured by the Brunauer, Emmett and Teller nitrogen adsorption method described on pages 29–32 of "Colloidal Dispersions" by Earl K. Fischer, published by John Wiley and Sons in 1950.

An appropriate amount of pigment is then added to the solution, which is then subjected to shear, as by sand-grinding or ball-milling, to deagglomerate and disperse the pigment. This pigment dispersion or mill base can then be added directly to a paint in the usual way and amount.

Polymeric materials of the invention preferred for use as pigment dispersing aids are those of formula (1) wherein A is an amino-, hydroxy- or mercapto substituted amine or amine salt radical. Especially preferred are those materials where A is

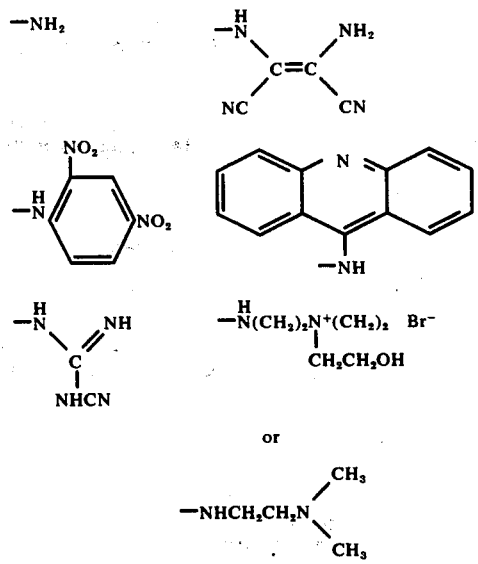

Also preferred are the polymeric materials of formula (1) wherein Q is a resinous or non-resinous polymeric or copolymeric segment of
  a. an ester of acrylic acid (AA) or methacrylic acid (MAA) with an alkanol of 1–18 carbon atoms;
  b. styrene or acrylonitrile;
  c. a vinyl ester whose ester moiety contains 2–18 carbon atoms; or
  d. a vinyl ether.

"Resinous", as used in this context, refers to a polymeric segment having a number average molecular weight of about 10,000–100,000. "Non-resinous", as used in this context, refers to a polymeric Q segment having a number average molecular weight of 500–10,000.

Number average molecular weight is determined by dynamic membrane osmometric techniques using a Mechrolab 501 Osmometer, sold by the Mechrolab, Inc. division of HewlettPackard Co., Mountain View, Calif.

Especially preferred are those polymeric materials of formula (1) wherein Q is a resinous or non-resinous
  1. polymeric segment one of whose monomer units is methyl methacrylate (MMA),
  2. copolymeric segment of MMA and an ester of AA or MAA with an alkanol of 2–12 carbon atoms, or
  3. MMA/2-ethylhexyl acrylate (2-EHA), copolymeric segment.

Polymeric materials of the invention also preferred are those of formula (1) wherein X is $$-S-R-Z$$

where R is alkylene of 1–6 carbon atoms, and

Z is $-O-$, $-S-$, $-C\overset{\overset{O}{\|}}{-}O-$ or $-NH-$.

Also especially preferred are those polymeric materials of formula (1) wherein Y is

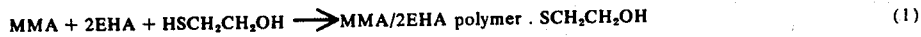

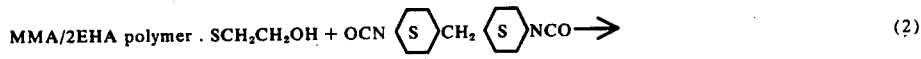

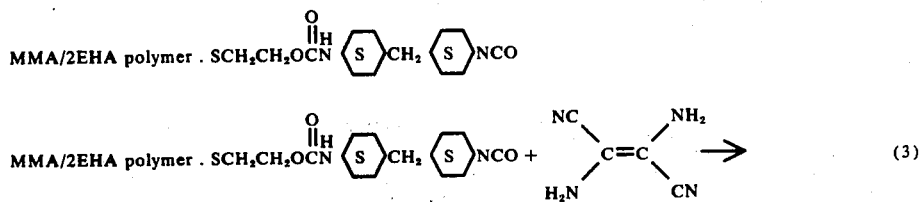

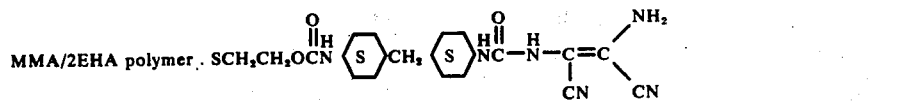

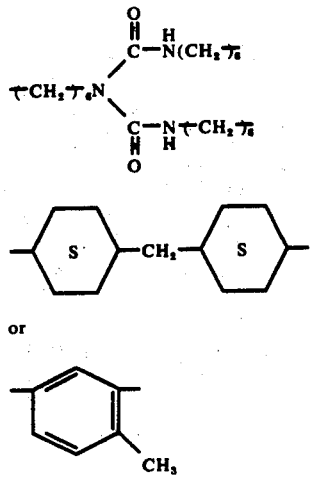

or

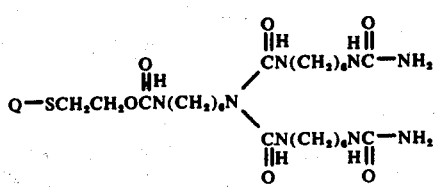

The polymeric material most preferred for use as a pigment dispersing aid is that represented by the structure $$Q-SCH_2CH_2OCN(CH_2)_6N\begin{matrix}CN(CH_2)_6NC-NH_2\\ \|H\quad H\|\\O\quad\quad O\\CN(CH_2)_6NC-NH_2\\\|H\quad H\|\\O\quad\quad O\end{matrix}$$

where Q is a MMA/2-EHA polymeric segment.

The polymers of the invention are also useful for dispersing magnetic oxides such as iron oxide or chromium dioxide in compositions used to prepare magnetic tape. Use of 0.5–10%, by weight of such a composition, of a polymer of the invention promotes wetting of the oxide, improves adhesion of the composition to the tape substrate and improves the tape's magnetic properties

Preparation of the Polymeric Materials

The materials of the invention can be prepared according to the illustrative equation According to this equation, a suitable organic liquid such as toluene, methylethyl ketone, methylisobutyl ketone, butyl acetate, ethyl acetate, benzene, xylene, an either such as ethylene glycol diethyl ether or Cellosolve acetate, or mixtures of these, is brought to a temperature of 50°–120° C. To this organic liquid is then added, over a 1–6 hour period, a solution of the monomer(s) which is to produce the polymeric segment B of the polymeric material, a chain transfer agent bearing functional groups such as 2-mercaptoethanol, 2-mercaptopropanol, 2-mercaptoethylamine or 2-hydroxyethyl disulfide, and a free radical polymerization initiator such as azobisisobutyronitrile.

One chooses the proportions of monomer, chain transfer agent and initiator according to the formula $$MW_n = \frac{\text{total mols monomer}}{\text{total mols transfer agent} + X(\text{mols of catalyst})}$$

(where $X$ is the number of free radicals per mole of catalyst and $MW_n$ is the number average molecular weight of the polymer desired).

It is desirable that the monomer, chain transfer agent and initiator be in solution. If they are not, enough of an appropriate solvent should be added to put them into solution.

The reaction mass is then heated at a temperature of 50°–120° C. until reaction is about 90% complete, as determined by viscosity measurements. Ordinarily, at completion, the mass has a Gardner-Holdt viscosity of F to N. Four to five hours or reaction time is ordinarily enough.

An appropriate di-, tri- or tetraisocyanate, in an amount equimolar to the chain transfer agent, is then added to the reaction mass, still at elevated temperature. Illustrative of the isocyanates which can be used are

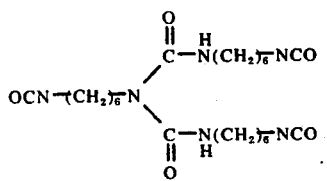

(Desmodur N, sold by Farbenfabriken Bayer, AG)

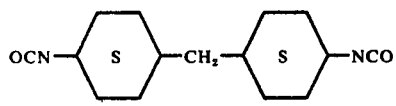

("Hylene" W organic isocyanate, sold by
E.I. du Pont de Nemours and Company)

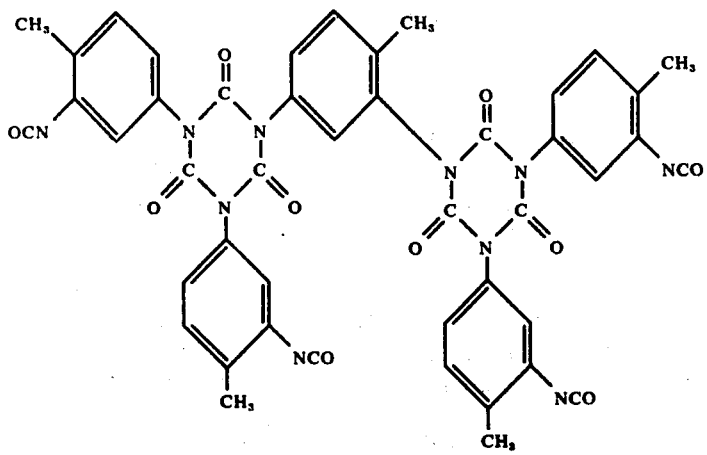

(Desmodur IL, sold by Farbenfabriken Bayer, AG)

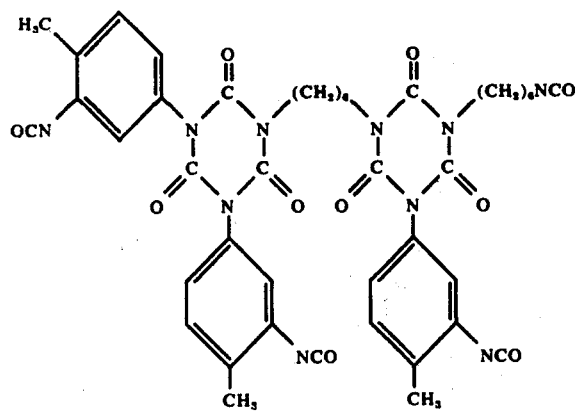

(Desmodur HL, sold by Farbenfabriken Bayer, AG)

and toluene diisocyanate

A catalyst for the isocyanate reaction is then added to the reaction mass. Illustrative are dibutyltin dilaurate and tertiary amines such as triethylenediamine. The amount of isocyanate reaction catalyst used is normally 0.5 to about 2%, by weight of the isocyanate used.

The reaction mass is then heated until the isocyanate-chain transfer agent reaction is complete. This ordinarily takes about 5–60 minutes at 80° C.

The reactant which provides the A moiety of the polymeric material is then added as a solution in one of the organic liquids previously mentioned. The amount used is about 0.8–1, preferably 0.95 molar, based on the unreacted isocyanate. The reaction mass is then heated to 25°–60° C., with stirring, for another 5–60 minutes.

This A moiety-providing reactant can be any base having a $pk_a$ value of 5–14 and bearing a radical capable of reacting with an isocyanate, such as —SH, —OH or —NH$_2$. Illustrative of these bases are

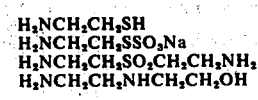

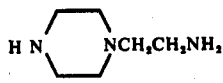

$H_2NC(CH_2OH)_3$

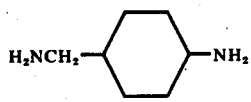

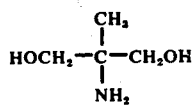

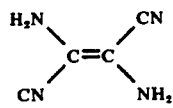

$CH_3CHOHCH_2NH_2$
$H_2NCH_2CH_2CH_2OH$
$HOCH_2CH_2NH_2$

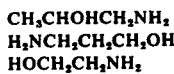

$H_2NCH_2CH_2N(CH_3)_2$
$HOCH_2CH_2NHCH_2CH_2OH$

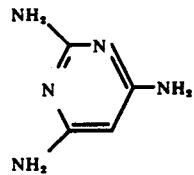

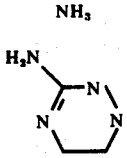

The salts can be made by neutralizing the product with acid, by reacting it with an alkyl halide such as methyl iodide, or by other conventional methods.

The organic liquid can be stripped from the reaction mass by heating it under vacuum to give a polymeric material of the invention. In practice, the product is ordinarily used in solution, as prepared.

If mixtures are produced by these reactions, the materials can be isolated by chromatography.

PREFERRED EMBODIMENTS OF THE INVENTION

The following examples are submitted so that the invention may be more readily understood and practiced.

Those skilled in the art will, no doubt, be able to compose numerous variations on their central theme, such as the attachment of innocuous substituents to the polymeric material molecule. It is naturally considered that these variations are a part of the invention.

In the examples, all parts are by weight.

EXAMPLE 1

2-ethoxyethyl acetate (150 parts) was placed in a reaction vessel. The liquid was heated to 100° C. and held there as a solution of 940 parts of MMA, 298 parts of 2-EHA, 125 parts of butyl acrylate (BA), 17.2 parts of 2-mercaptoethanol, 4.9 parts of azobisisobutyronitrile and 500 parts of 2-ethoxyethyl acetate were added continuously over a 4-hour period.

To 1000 parts of this solution were then added 82.5 parts of Desmodur N, 0.5 parts of dibutyltin dilaurate, and 300 parts of 2-ethoxyethyl acetate.

A mixture of 34 parts of cyanoguanidine and 400 parts of 2-ethoxyethyl acetate, previously heated at reflux temperature of 1 hour, was then added to this solution, at reflux temperature, over a two-hour period. Refluxing was continued for another hour. The solution was then cooled and decanted from excess cyanoguanidine.

The resulting product was a colorless, nearly clear solution containing a polymeric material represented by the structure

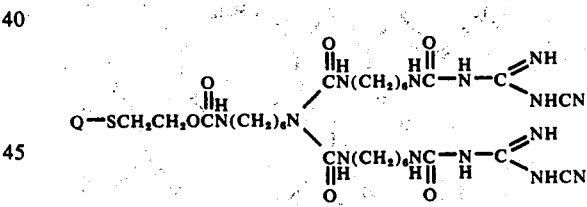

where Q is an MMA/2-EHA/BA terpolymeric segment.

A mixture of 1 part of this solution, 1 part of phthalocyanine blue pigment and 8 parts of xylene was sandground. The resulting pigment dispersion showed excellent deflocculation.

An automotive lacquer containing this dispersion gave a glossy film with excellent color development.

EXAMPLE 2

A polymeric material was prepared according to the method of Example 1 by using 800 parts of ethyl acrylate (EA), 172 parts of vinyl acetate (VAc), 256 parts of butyl acrylate (BA), 23.4 parts of 2-mercaptoethanol and 4.9 parts of azobisisobutyronitrile in 800 parts of 2-ethoxyethyl acetate as the feed solution in the initial part of the reaction.

The resulting product was a solution containing a polymeric material represented by the structure

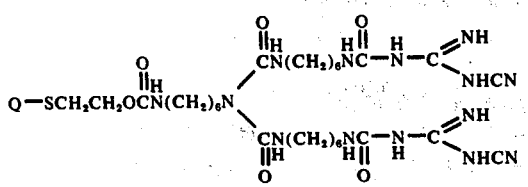

where Q is an EA/BA/VAc terpolymeric segment.

EXAMPLE 3

A polymeric material was prepared according to the method of Example 1, using an initial feed solution of 1000 parts of EA, 320 parts of BA, 169 parts of octadecyl methacrylate (OMA), 10 parts of tertiary butylperoctoate, 29.6 parts of 2-mercaptoethanol and 1000 parts of 2-ethoxyethyl acetate.

The product was a solution containing a polymeric material represented by the structure

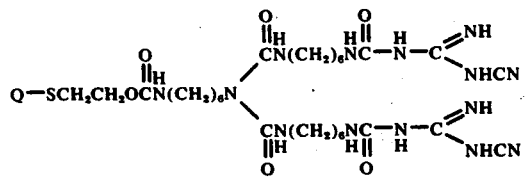

where Q is an EA/BA/OMA terpolymeric segment.

EXAMPLE 4

Toluene (226.7 parts) was placed in a steel reaction kettle. The toluene was heated to reflux temperature and held there while a solution of 226.7 parts of MMA, 126 parts of 2-EHA, 90.7 parts of toluene, 4.44 parts of 2-mercaptoethanol and 0.903 part of azobisisobutyronitrile was added over a 4-hour period.

A solution of 0.25 part azobisisobutyronitrile in 2.5 parts of methylisobutyl ketone was then added in three equal portions at 15-minute intervals. A water separator was then attached and refluxing was continued for another 45 minutes to remove water.

To this reaction mass were then added 43.21 parts of Desmodur N. The Desmodur container was rinsed with 3.78 parts of toluene, which was also added to the reaction mass. The mass was stirred for 5 minutes, 0.51 part of dibutyltin dilaurate was added and its container rinsed with 1.89 parts of toluene, which was also added to the mass.

The resulting solution was the refluxed for one hour, cooled to 25° C. and ammonia was bubbled through it, with stirring, for 15 minutes. Excess ammonia was purged from the mass with a stream of nitrogen.

The product was a solution containing a polymeric material represented by the structure

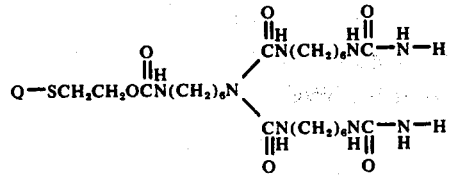

where Q is an MMA/2-EHA polymeric segment.

EXAMPLE 5

Methylethyl ketone (241.9 parts was placed in a steel reaction kettle, heated to reflux temperature and held there while a solution of 219.9 parts of MMA, 131.9 parts of 2-EHA, 66 parts of methylethyl ketone, 4.3 parts of 2-mercaptoethanol and 0.88 part azobisisobutyronitrile was added over a 4-hour period.

Refluxing was continued as a solution of 0.22 part of azobisisobutyronitrile in 4.2 parts of methylethyl ketone was added in three equal portions at 15 minute intervals. Refluxing was then continued for another 30 minutes.

To this solution were then added 43.21 parts of Desmodur N. The container was rinsed with 11 parts of methylethyl ketone, which was also added to the reaction mass.

After this solution was stirred for 5 minutes, 0.5 part of dibutyltin dilaurate was added and its container rinsed with 4.4 parts of methylethyl ketone, which was also added to the reaction mass.

The solution was then refluxed for 2 hours.

This polymer solution (1200 parts) and 33.5 parts of 2,4 dinitroaniline were stirred and heated at reflux temperature for two hours.

The resulting product was a solution containing a polymeric material represented by the structure

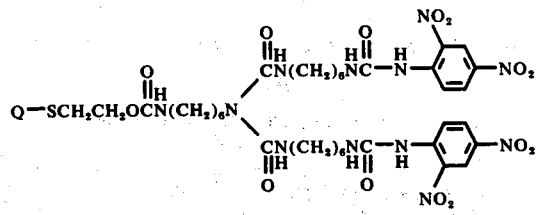

where Q is an MMA/2-EHA polymeric segment.

EXAMPLE 6

A polymeric material was prepared according to the method of Example 5 by using 31 parts of 2-methoxy-5-nitroaniline in place of the 2,4-dinitroaniline.

The resulting product contained a polymeric material represented by the structure

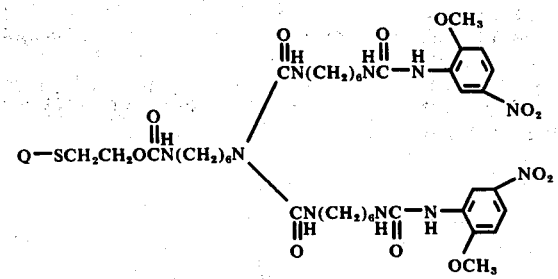

where Q is an MMA/2-EHA polymeric segment.

EXAMPLE 7

A polymeric material was prepared according to the method of Example 5 by using 19.7 parts of diaminomaleonitrile in place of the 2,4-dinitroaniline.

The resulting product contained a polymeric material represented by the structure

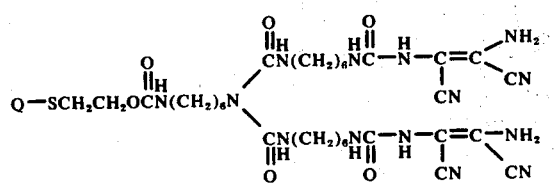

where Q is an MMA/2-EHA polymeric segment.

EXAMPLE 8

To 1200 parts of the solution of the diisocyanate terminated polymeric intermediate prepared in Example 4 were added 15.9 parts of 3-amino-1H-1,2,4-triazole and 310 parts of 2-ethoxyethyl acetate.

This mixture was stirred for 2 hours at 25° C. and then heated at about 100° C. until nearly all of the solids dissolved.

The solution was then cooled to give a solution containing a polymeric material represented by the structure

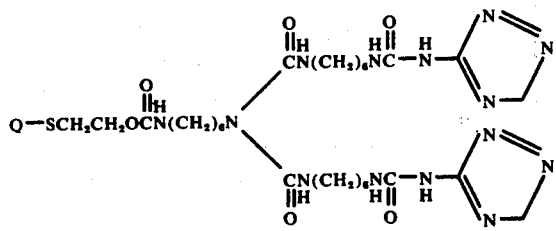

where Q is an MMA/2-EHA polymeric segment.

EXAMPLE 9

Benzene (250 parts) was placed in a reaction vessel. The benzene was then heated to reflux temperature and held there while a solution of 1000 parts of EA, 320 parts of BA, 169 parts of OMA, 30 parts of 2-mercaptoethanol and 8.2 parts of azobisisobutyronitrile in 950 parts of benzene was added continuously over a 5-hour period.

The resulting solution was concentrated on a rotary evaporator to give 1496 parts of a stiff, colorless oil.

Twenty-seven parts of this oil were dissolved in 100 parts of dimethylformamide and the solution mixed with a solution of 3.5 parts of Desmodur N and 0.1 part of dibutyltin dilaurate in 30 parts of dimethylformamide.

The resulting solution was then stirred at 140° C. for 3 hours and 1.6 parts of melamine added.

This solution was heated for another 2 hours at 140° C. and then poured into water. The oil which separated was washed with water, dissolved in tetrahydrofuran and dried under vacuum to give 19.5 parts of a glassy product containing polymeric material represented by the structure

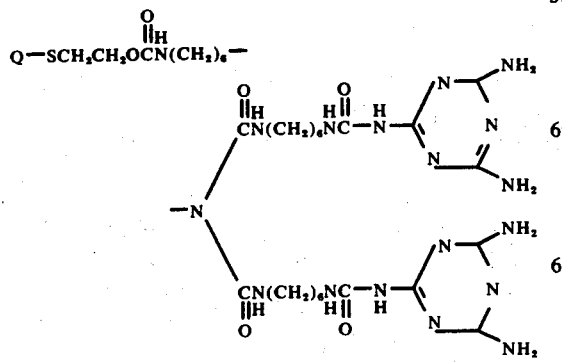

where Q is an EA/BA/OMA terpolymeric segment.

EXAMPLE 10

A mixture of 3008 parts of the isocyanate terminated intermediate polymer prepared in Example 1, 10.5 parts of 2-ethoxyethyl acetate, and 54 parts of N,N-dimethylethylenediamine was stirred for 1 hour at room temperature and then held at 100° C. for 15 minutes.

The resulting product was a 50% solution containing a polymeric material represented by the structure

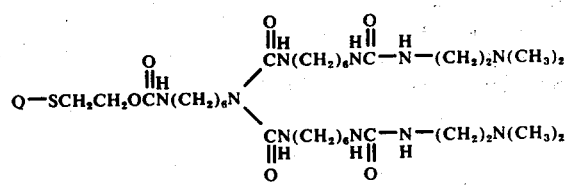

where Q is an MMA/BA/2-EHA terpolymeric segment.

EXAMPLE 11

The product of Example 10 (536 parts) was mixed with 22.8 parts of methyl iodide and 200 parts of methylethyl ketone at room temperature.

This mixture was allowed to stand for 4 days at room temperature. The resulting solution was then filtered through Celite to give a solution containing a polymeric material represented by the structure

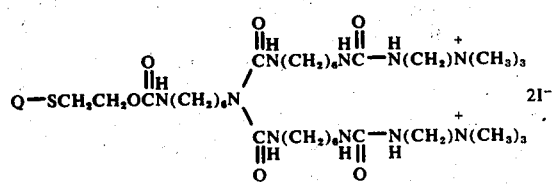

where Q is an MMA/BA/2-EHA terpolymeric segment.

EXAMPLE 12

The isocyanate terminated intermediate polymeric material prepared in Example 5 (700 parts) was heated to reflux temperature and held there while a solution of 18.7 parts of 9-aminoacridine in 374 parts of methylethyl ketone was added. The mixture was then refluxed for another 15 minutes.

The resulting product was a solution containing polymeric material represented by the structure

-continued

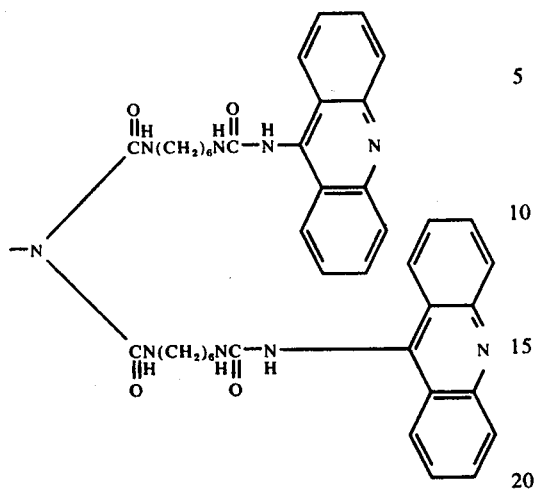

where Q is an MMA/2-EHA polymeric segment.

The polymeric materials of Examples 2-12 can be used as pigment dispersants in the same fashion as shown in Example 1, with similar results.

I claim:

1. A polymeric material represented by the structure

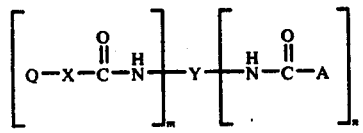

where
Q is a resinous polymeric or copolymeric segment of
   a. an ester of acrylic acid or methacrylic acid with an alkanol of 1-18 carbon atoms;
   b. styrene or acrylonitrile;
   c. a vinyl ester whose ester moiety contains 2-18 carbon atoms; or
   d. a vinyl ether;
X is the residue of a chain transfer agent;
Y is the residue of a di-, tri-, or tetraisocyanate radical after removal of isocyanate groups;
A is the residue of a basic radical which, as an entity before reaction, has a pk$_a$ value of 5-14, or a salt thereof; and
m and n are 1, 2 or 3, the total not exceeding 4, provided that when n is 2 or 3, only one of A need be as defined.

2. The polymeric material of claim 1 wherein A is an amino-, hydroxy- or mercapto substituted amine or amine salt radical.

3. The polymeric material of claim 1 wherein A is a radical of the formula

 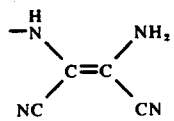

-continued

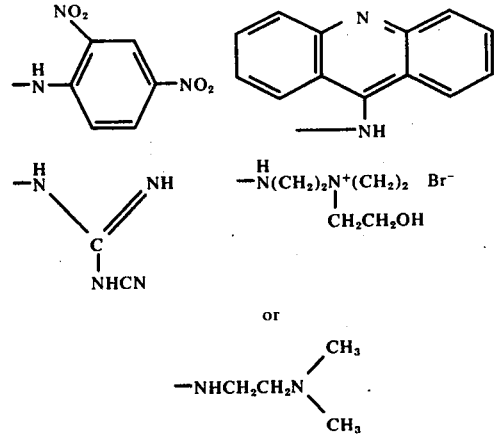

4. The polymeric material of claim 1 wherein Q is a polymeric segment one of whose monomer units is methyl methacrylate.

5. The polymeric material of claim 1 wherein Q is a copolymeric segment of methyl methacrylate and an ester of acrylic acid or methacrylic acid with an alkanol of 2-12 carbon atoms.

6. The polymeric material of claim 1 wherein Q is a methyl methacrylate/2-ethylhexyl acrylate copolymeric segment.

7. The polymeric material of claim 1 wherein X is

—S—R—Z where R is alkylene of 1-6 carbon atoms and

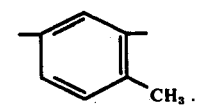

8. The polymeric material of claim 1 where Y is

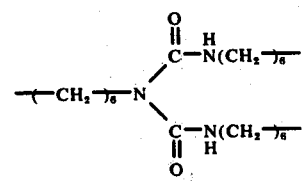

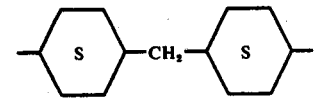

9. A polymeric material represented by the structure

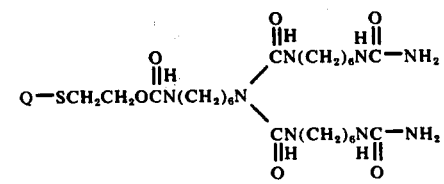

where Q is a resinous methyl methacrylate/2-ethylhexylacrylate polymeric segment.

* * * * *